(12) United States Patent
Hayasaki et al.

(10) Patent No.: US 9,074,378 B2
(45) Date of Patent: Jul. 7, 2015

(54) RECYCLABLE FORMWORK

(75) Inventors: Masahiro Hayasaki, Fukuoka (JP);
Shigeyuki Nishijima, Fukuoka (JP);
Hideyuki Yamamoto, Fukuoka (JP)

(73) Assignee: JUST.WILL CO., LTD., Fukuoka (JP)

( * ) Notice: Subject to any disclaimer, the term of this patent is extended or adjusted under 35 U.S.C. 154(b) by 0 days.

(21) Appl. No.: 14/236,449

(22) PCT Filed: Aug. 3, 2012

(86) PCT No.: PCT/JP2012/069870
§ 371 (c)(1),
(2), (4) Date: May 1, 2014

(87) PCT Pub. No.: WO2013/021951
PCT Pub. Date: Feb. 14, 2013

(65) Prior Publication Data
US 2014/0239147 A1 Aug. 28, 2014

(30) Foreign Application Priority Data
Aug. 8, 2011 (JP) ................. 2011-173150

(51) Int. Cl.
*E04G 9/05* (2006.01)
*E04G 9/10* (2006.01)
(Continued)

(52) U.S. Cl.
CPC .. *E04G 9/05* (2013.01); *E04G 9/10* (2013.01);
*G01K 1/143* (2013.01); *G01K 1/024* (2013.01);
*E04G 2009/028* (2013.01); *E04G 9/06*
(2013.01); *B28B 17/0063* (2013.01); *B28B*
*7/42* (2013.01)

(58) Field of Classification Search
USPC ........................................ 425/63; 264/187.1
See application file for complete search history.

(56) References Cited

U.S. PATENT DOCUMENTS

| | | | |
|---|---|---|---|
| 4,131,405 A * | 12/1978 | Moore | .......................... 425/143 |
| 2007/0210814 A1 | 9/2007 | Albadri et al. | |
| 2011/0115613 A1* | 5/2011 | Kaga et al. | .................. 340/10.51 |

FOREIGN PATENT DOCUMENTS

| | | |
|---|---|---|
| JP | 63-44076 | 2/1988 |
| JP | 5-306599 | 11/1993 |
| JP | 7-26717 | 1/1995 |
| JP | 7-229297 | 8/1995 |

(Continued)

OTHER PUBLICATIONS

International Search Report issued Aug. 28, 2012 in corresponding International Application No. PCT/JP2012/069870.

*Primary Examiner* — Jacob Thomas Minskey
(74) *Attorney, Agent, or Firm* — Wenderoth, Lind & Ponack, L.L.P.

(57) ABSTRACT

A recyclable formwork can suitably detect temperature of concrete cast contacting with the formwork in a field without spoiling the other functions of the formwork. The recyclable formwork is provided with: a main unit (1) including a plurality of ribs (3) and (4); a case (7) being housed between the ribs (3) and (4), the case (7) being fixed on a non-contact surface (1a); and a circuit housed in the case (7). A through-hole (16) is opened at a position corresponding to where the case (7) is fixed, the through-hole (16) penetrating the main unit (1) from the non-contact surface (1a) to a contact surface (2). A sensor-housing case (17) is provided with a lower portion of the case (7), the sensor-housing case (17) being inserted into the through-hole (16), a bottom face of the sensor-housing case (17) facing concrete. And, a concrete temperature-detecting sensor (19) for detecting surface temperature of the concrete is housed in the sensor-housing case (17).

4 Claims, 6 Drawing Sheets

(51) Int. Cl.
*G01K 1/14* (2006.01)
*G01K 1/02* (2006.01)
*E04G 9/06* (2006.01)
*B28B 17/00* (2006.01)
*B28B 7/42* (2006.01)
*E04G 9/02* (2006.01)

(56) References Cited

FOREIGN PATENT DOCUMENTS

| | | |
|---|---|---|
| JP | 2000-94428 | 4/2000 |
| JP | 2001013013 A * | 1/2001 |
| JP | 2008-114376 | 5/2008 |

* cited by examiner

RECYCLABLE FORMWORK

BACKGROUND OF THE INVENTION

1. Field of the Invention

The present invention relates to a recyclable formwork whose working condition can be easily known. The recyclable formwork is represented by a plastic formwork. The recyclable formwork, however, may be not only the plastic formwork but also a metal formwork, especially a formwork of aluminium, iron, or steel, as long as characteristics thereof, such as a weight, a price, or the like are suitable.

2. Description of the Related Art

Countermeasures against greenhouse gas represented by carbon dioxide are important subjects in which human beings should immediately aim to solve. Carbon dioxide reduction should be carried out strongly without damaging an economy. The inventors will discuss a new proposition in a field of formworks used for curing concrete.

Until now, formworks are mainly concrete panels made of tropical wood.

Instead of the concrete panels, plastic formworks are developed and used. Some types of the plastic formworks can be perfectly recycled and are regarded as next-generafion formworks.

However, there are the following probletns with respect to the plastic formworks. First, a unit price of the plastic formworks is about five times of that of concrete panels. Secondly, initial investment for the plastic formworks is extensive. Furthermore, the investment cannot be amortized in one construction field.

As for costs considering a number of repetitive use times the first number of repetitive use times of the concrete panels are normally about five, and the second number of repetitive use times of the plastic formworks is about fifty, that is, ten times of the first number. As for costs per one time use, which is obtained by dividing the unit prices by the numbers of repetitive use times, the concrete panels is almost the double of the plastic formworks. The plastic formworks are superior to the concrete panels with respect to not only environmental load but also the cost per one time use.

However, since there is no means for effectively managing a long used time of the plastic formworks, the plastic formworks have not been practically and widely used yet.

The formworks are brought to a construction field to be built there. Next, concrete is cast between the built formworks for curing, the concrete is hardened and solidified, and then the formworks are removed. However, curing time remarkably differs according to portions of a structure to be built, such as a wall, a beam, and a floor.

There is no technical means for managing the formworks taking the differences of curing time caused by the portions where the formworks are used into consideration. Actually, a construction supervisor of the construction field and the men use the formworks on their hunches.

In short, it is impossible to solve the above problem with conventional plastic formworks and it is necessary to add a new function to the conventional plastic formworks. Furthermore, consideration must be done such that the added new function does not spoil the other functions of the plastic formworks. Technique that satisfies such requirement has not been known yet.

A sensing function is one of the functions to be added. With respect to each recyclable formwork, it is required to manage the remainder of use times until next recycling, concrete temperature determining quality of concrete-curing, and so on by managing the used time. The present invention particularly relates to managing concrete temperature among these subjects.

[Document 1] Japanese patent application Laid-open on No. H07-26717

[Document 2] Japanese patent application Laid-open on No. H07-229297

OBJECTS AND SUMMARY OF THE INVENTION

In view of the above, an object of the preset invention is to provide a recyclable formwork that can suitably detect temperature of concrete cast contacting with the formwork in a field without spoiling the other functions of the formwork.

A first aspect according to the present invention provides a recyclable formwork, comprising: a main unit including a contact surface contacting with cast concrete, a non-contact surface being parallel and opposite to the contact surface, and a plurality of ribs penetrating from the non-contact surface to a side opposite to the non-contact surface and reinforcing the main unit; a case being housed between the plurality of ribs and being fixed on a side of the non-contact surface; and a circuit being stored in the case, wherein: a through-hole is opened at a position corresponding to where the case is fixed, the through-hole penetrating said main unit from the non-contact surface to the contact surface; a sensor-housing case is provided with a lower portion of the case, the sensor-housing case being inserted into the through-hole, a bottom face of the sensor-housing case facing the concrete; and a concrete temperature-detecting sensor is housed in the sensor-housing case, the concrete temperature-detecting sensor detecting surface temperature of the concrete.

In this structure, since the bottom face of a sensor-housing case penetrates the through-hole and faces the concrete, the concrete temperature-detecting sensor can measure the surface temperature of the concrete-cast in a field with high precision.

For example, when RFID tags including temperature sensors are mixed into concrete and the temperature sensors communicate with external communication devices so as to measure the temperature of the concrete, the temperature sensors cannot be reused after curing because the temperature sensors have been united with the fixed concrete. It is impractical and almost impossible to destroy the fixed concrete in order to take out the temperature sensors there-from. The RFID tags are foreign objects seen from the concrete. Accordingly, mixing them into the concrete may cause to damage homogeneous, strength, or the like of the concrete.

Whereas, according to this structure, the concrete temperature-detecting sensor is removed from the concrete with the recyclable formwork after curing and can be repeatedly and favorably used.

Graduations of the temperature of the concrete can be known by measuring the same. As predetermined reaction successfully advances, the temperature rises, and then falls until air temperature. If proper graduations are obtained, quality of cast concrete can be managed and guaranteed.

A second aspect according to the present invention as defined in the first aspect provides a recyclable formwork, wherein the bottom face of the sensor-housing case is set flush with the contact surface.

Since the bottom face is set flush with the contact face even when curing has been completed, this arragment enables to reduce unevenness near the bottom face and to obtain good appearances.

A third aspect according to the present invention as defined in the first aspect provides a recyclable formwork, wherein a concrete-detecting sensor is further housed in the sensor-housing case, the concrete-detecting sensor detecting whether or not the concrete is contacting with the contact face.

This arrangement enables to detect when the concrete-detecting sensor begins to contact with the concrete, thereby precisely detecting time when curing the concrete starts.

The present invention enables to suitably detect temperature of concrete cast contacting with the formwork in a field without spoiling the other functions of the formwork, thereby managing quality of cured concrete. Furthermore, the concrete temperature-detecting sensor can be repeatedly used.

DETAILED DESCRIPTION OF THE PREFERRED EMBODIMENTS

Embodiments of the present invention will now be described with reference to the drawings.

Figure 1:
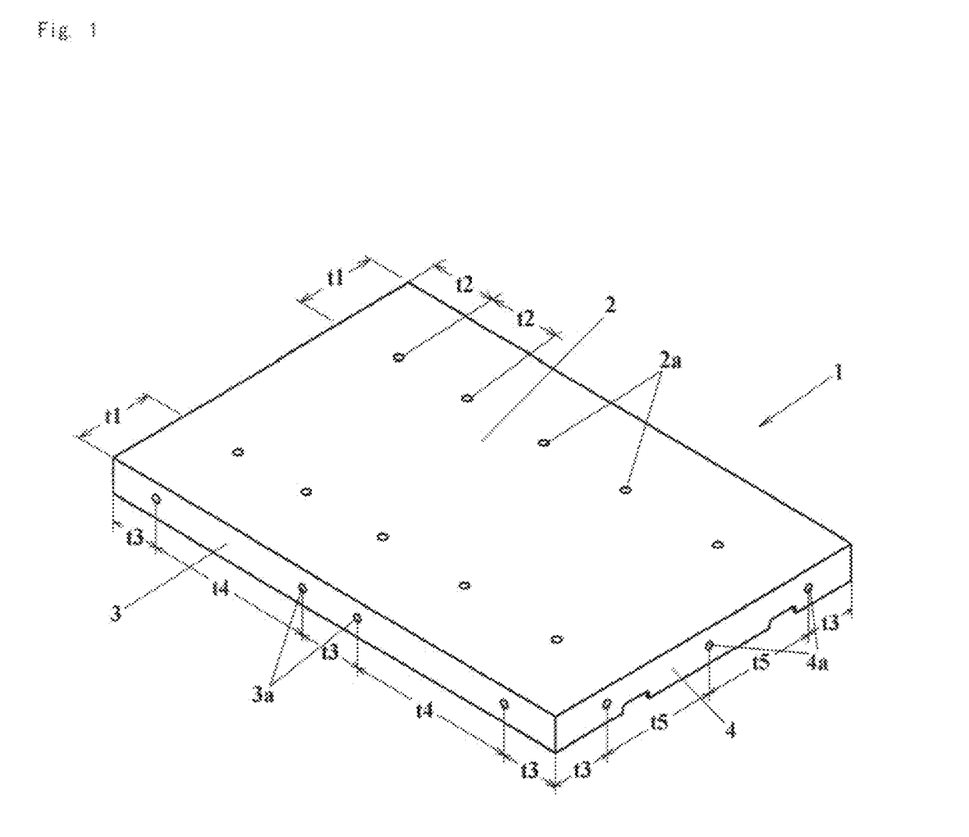
FIG. 1 is a perspective diagram showing a view of a recyclable formwork according to Embodiment 1 of the present invention from a contact surface.
Figure 2:
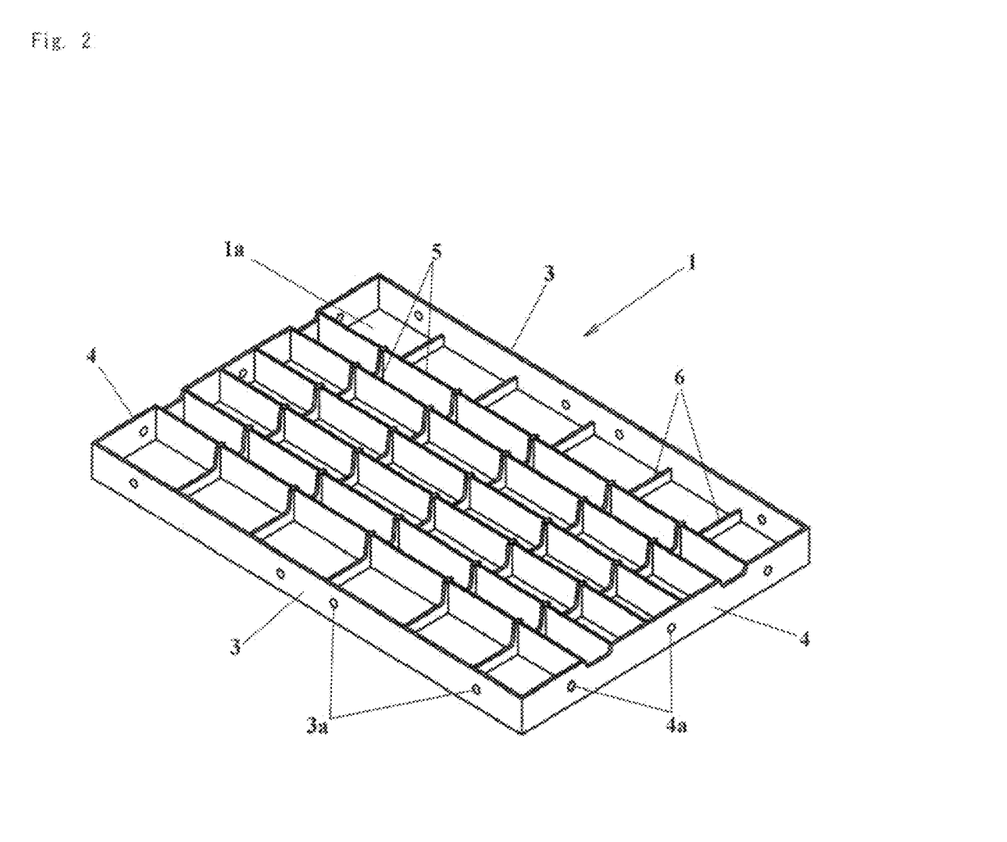
FIG. 2 is a perspective diagram showing another view of the recyclable formwork according to Embodiment 1 of the present invention from a non-contact surface.

FIG. 1 is a perspective diagram showing a view of a recyclable formwork according to Embodiment 1 of the present invention from a contact surface, and FIG. 2 is a perspective diagram showing another view of the recyclable formwork according to Embodiment 1 of the present invention from a non-contact surface. Both of FIG. 1 and FIG. 2 illustrate a state where a case has not been provided yet.

As illustrated in FIG. 1, a main unit 1 of the recyclable formwork of the embodiment is formed almost in a rectangle. A plurality of separator holes 2a are opened in determined pitch on a contact face 2 contacting with concrete when being cast. The plurality of separator holes are formed so as to insert separators (not shown) therein. The separators lead from the contact surface 2 to a non-contact surface 1a. The outside dimensions of the main unit 1 of the recyclable formwork may be determined based on dimensions of concrete panels. For example, a short side may be determined as 60 cm, and a long side may be determined as 90 cm. Of course, the values are merely examples, and can be changed variously.

The separator holes 2a are formed at a factory where manufactures the main unit 1 of the recyclable formwork, and have very high precision. When not being inserted and used, the separator holes 2a should be closed with stoppers (not shown) made of resin (for example, polypropylene, or the like.). It is preferable to prohibit to open holes other than the separator holes 2a on the construction field.

Concerning this point, field-workers often make holes, using drills, in concrete panels without a hole at a construction field where the concrete panels of wood are used. Such operations not only need long time and hard labor but also cause problems with respect to precision of the positions and/or dimensions of opened holes in many cases.

When concrete panels in which holes have been made according to a certain dimension system are re-used in another construction field, the other holes according to anther dimension system are further made therein and the concrete panels become hard to be used since there are too many holes. Since it is troublesome to close opened and not used holes with stoppers, the concrete panels with the opened holes may be used. Such a situation is unfavorable.

According to the embodiment, there are not the above disadvantages. Since the recyclable formwork has short sides of 60 cm and long sides of 90 cm, intervals t1 from the long sides to the separator holes 2a are determined as 15 cm. When the main units 1 and 1 of recyclable formworks of FIG. 2 are horizontally arranged, the interval between separator holes of the recyclable formworks adjacent to each other becomes 30 cm.

The main units 1 of the recyclable formworks are not merely formed so as to have a shape of a simple plate. That is, long side edge ribs 3 and short side edge ribs 4 having the same height are installed downward (from the contact surface 2 to the non-contact surface 1a) in FIG. 1 from long sides and short sides. Clip holes 3a and 4a penetrating thickness of the ribs 3 and 4 are opened according to a first interval t3 of 10 cm, a second interval t4 of 30 cm, and a third interval t5 of 20 cm.

The recyclable formworks adjacent to each other can be connected when long sides or short sides of the recyclable formworks are adhered, U-shaped clips are inserted the clip holes 3a and 4a, thereby combining the long sides or the short sides with each other from the outside using the clips.

FIG. 2 illustrates the main unit 1 of recyclable formwork whose non-contact surface 1a looks upward. That is, in addition to the above-described long side edge ribs 3 and the short side edge ribs 4, a plurality of long side forcing ribs 5 and short side reinforcing ribs 6 each having the same maximum height as that of the long side edge ribs 3 and the short side edge ribs 4 are formed, thereby improving general strength of the main unit 1 of recyclable formwork.

As clear from FIG. 2, there is a space between the ribs. In this embodiment, a case 7 is housed and fixed into the space between the ribs. It is preferable to provide the case at a position near the center of the main unit 1. However, one of the other positions may be used instead. Screws are normally used for the attachment. One of the other methods or tools may be used instead.

Figure 3:
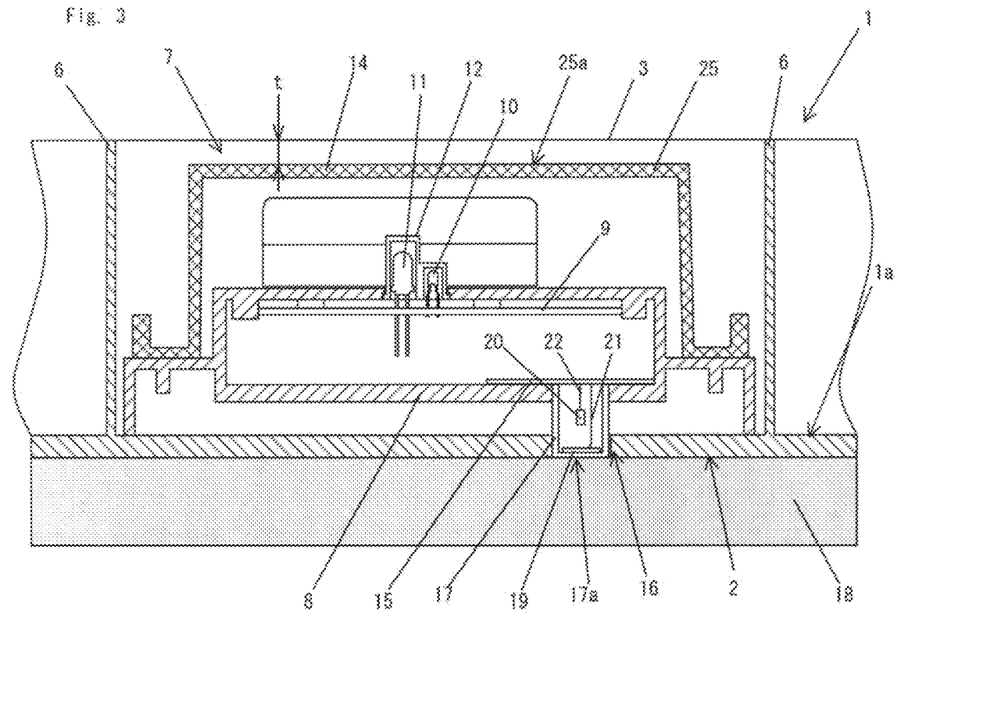
FIG. 3 is a sectionalsectionalview illustrating neighborhood of a case according to Embodiment 1 of the present invention.

FIG. 3 is a sectional view illustrating neighborhood of a case according to Embodiment 1 of the present invention. A through-hole 16 is opened at a position corresponding to the fixed case 7 in the main unit 1. The through-hole 16 penetrates the main unit 1 from a non-contact surface 1a to a contact surface 2. It is preferable to open the through-hole 16 and the separator hole 2a at the factory, The case 7 includes: a substrate holder 8 fixed contacting with the non-contact surface 1a of the main unit 1 of the recyclable formwork; a lid 25 covering an upper portion of the substrate holder 8; and a sensor-housing case 17 fixed on a lower portion of the substrate holder 8. The sensor-housing case 17 is inserted into the through-hole 16, and a bottom face of the sensor-housing case can face concrete 18.

The highest portion of the case 7 is an upper face 25a of the lid 25. The upper face 25a is formed lower (See, difference t) than an upper edge of the long side edge rib 3. Even when a set of the main units 1 and 1 are overlapped in parallel, the case 7 never protrudes rather than the long side edge rib 7. Accordingly, the set can be heaped tight as the same as main units 1 and 1 without the cases 7 and 7.

A battery case 14 storing a battery 45 (See, FIG. 5) therein is provided on an upper face of the substrate holder 8, and a main substrate 9 is fixed to an upper portion of the substrate holder 8.

Figure 5:
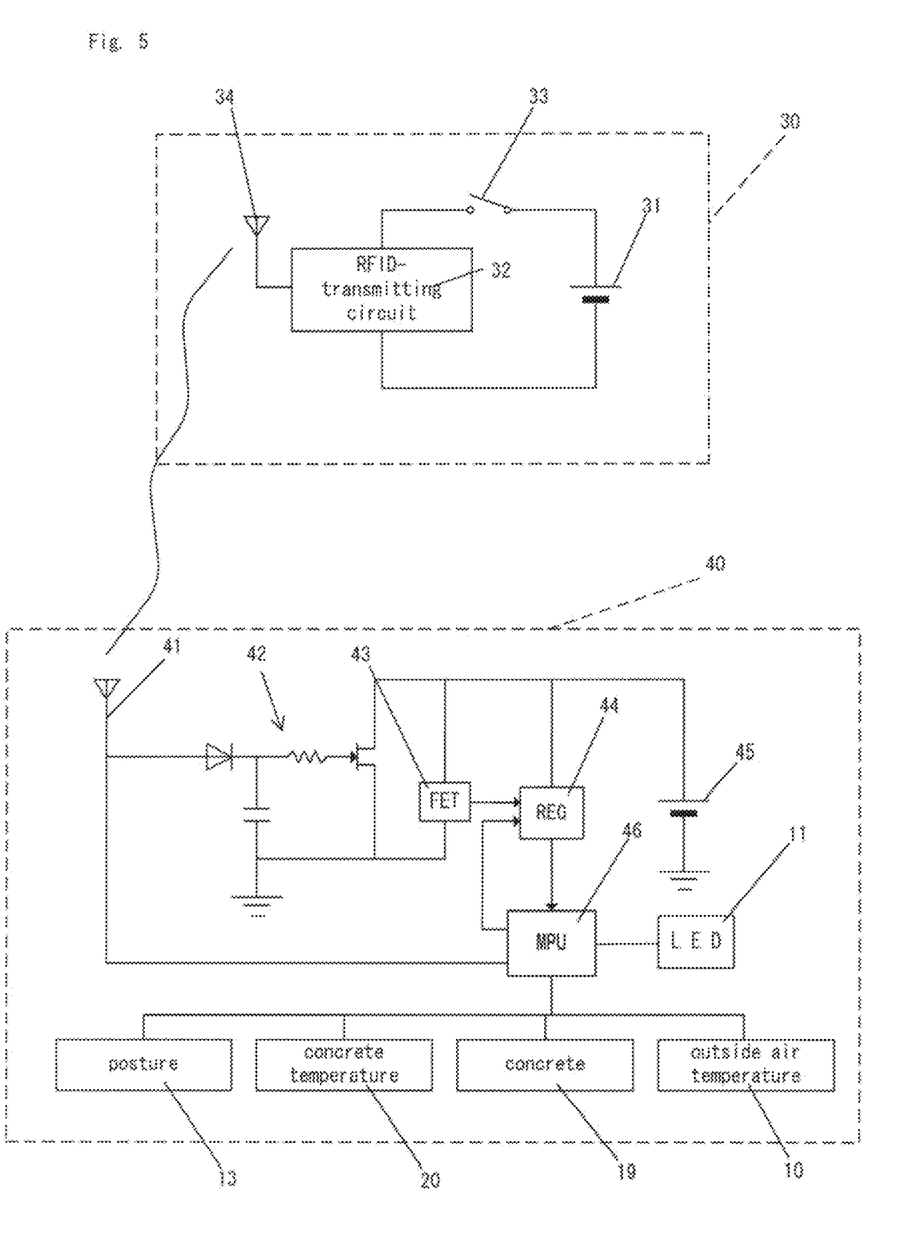
FIG. 5 is a block diagram illustrating transmitter and a receiver according to Embodiment 1 of the present invention.

Important components are implemented on the main substrate 9. The important components include as shown in FIG. 5; an antenna 41; a voltage application circuit 42; an FET 43; a regulator 44; a microprocessor 46; an LED 11; a posture-detecting sensor 13; an outside air temperature-detecting sensor 10; and so on. The detail of the components will be mentioned later.

Terminals of the LED 11 and the outside air temperature-detecting sensor 10, which are relatively tall, are inserted in the main substrate 9 to rise. A protection case 12 covers the LED 11 and the sensor 10 for their protection. The outside air temperature-detecting sensor 10 can be a thermistor, for example. It is preferable to arrange in a position separate from the sensor-housing case 17 as shown in FIG. 3.

A sensor substrate 15 uniting with the sensor-housing case 17 is fixed to a lower portion of the inside of the substrate holder 8.

A concrete temperature-detecting sensor 20, which may be a thermistor and detects surface temperature of concrete 18, is provided in the sensor-housing case 17. A concrete-detecting sensor 19 is provided with the inside of a bottom surface 17a of the sensor-housing case 17. The concrete temperature-detecting sensor 20 and the concrete-detecting sensor 19 are electrically connected to the sensor substrate 15 with terminals and cables 21 and 22, respectively.

Of course, the main substrate 9 and the sensor substrate 15 are electrically connected with cables (not shown).

It is preferable to form the sensor-housing case 17 in a shape of a cap using metal material with high thermal conductivity. It is also preferable to form the bottom face 17a of the sensor-housing case 17 as a plain set flush with the contact surface 2 when inserted. This is because this arrangement can prevent unevenness of the concrete 18 near the sensor-housing case 17.

Since the concrete 18 is alkaline, it is preferable to constitute the sensor-housing case 17 using material with high corrosion resistance (e.g. stainless steel including chromium and/or nickel) to be repeatedly used. Alternatively, a cap made with nickel-plated aluminium can be used suitably.

It is further preferable to fill the sensor-housing case 17 with material with high heat conductivity (e.g. resin) to improve response of the temperature-detecting sensor 20 to the concrete 18. It is suitable to select thermally conductive grease used for a heat sink as the material.

Figure 4:
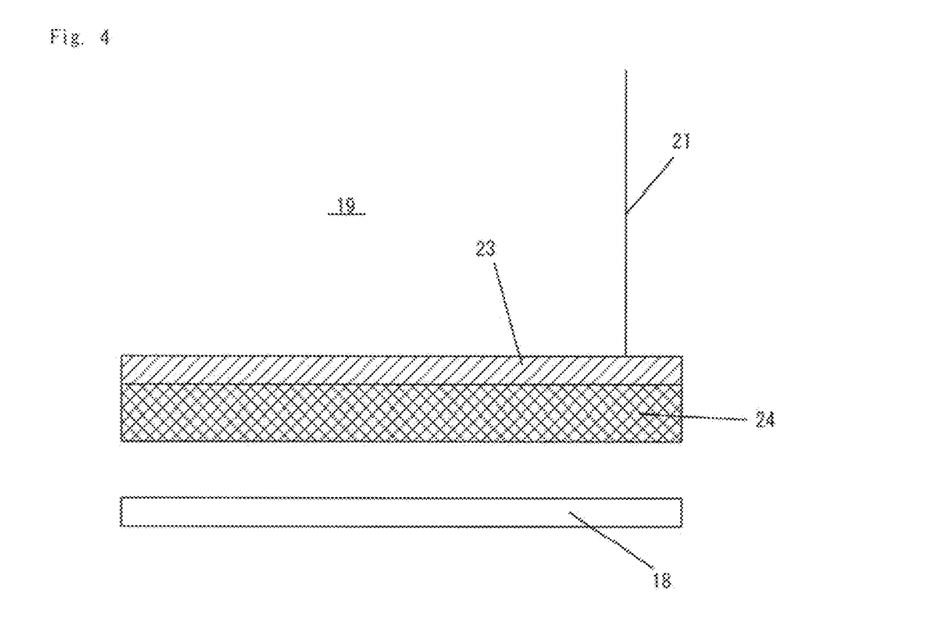
FIG. 4 is a sectional view illustrating a concrete-detecting sensor according to Embodiment 1 of the present invention.

FIG. 4 is a sectional view illustrating the concrete-detecting sensor 19 according to Embodiment 1 of the present invention. It is sufficient for the concrete-detecting sensor 19 to detect whether or not the concrete 18 exists near the sensor-housing case 17. A mechanical switch, a photo-sensor, a pH sensor, an electrical resistance meter or the like can be used as the sensor 19. However, it is preferable to select a capacitance sensor as the sensor 19 as shown in FIG. 4.

Referring to FIG. 4, principle using the capacitance sensor will now be explained. An electrode 23 is formed on a front surface of a glass epoxy substrate 24 (e.g. by patterning using copper foil), and a terminal and/or a cable 21 are/is connected thereto. A back surface of the glass epoxy substrate 24 is fixed to the inside of the bottom face 17a.

If the concrete 18 exists near the sensor-housing case 17, capacitance must change since material (the concrete 18) with dielectric constant differing from that of air is approaching the electrode 23. The concrete-detecting sensor 19 watches the change of the capacitance.

In this reason, the concrete-detecting sensor 19 can distinguish a first case (cast) where the concrete 18 exists near the sensor-housing case 17 from a second case (not cased or formwork-removed) where the concrete 18 does not exist near the sensor-housing case 17, and can determine concrete-cast time when the second case turns into the first case.

The concrete-detecting sensor 19 is preferably constituted as shown in FIG. 4 to ensure operation thereof. When the sensor-housing case 17 is a metal cap, the sensor-housing case 17 itself may be used as the electrode.

Next, a circuit within the sensor-housing case 17 will now be explained.

The main unit 1 is normally stored in a stock yard managed by a business unit (e.g. a rental company). When using, the main unit 1 is taken out from the stock yard, is loaded onto a carrier of a truck, and is conveyed to a construction field. And then, the main unit 1 arrives at the construction field, is unloaded from the carrier, and is set up with supports in the field.

After using, the main unit 1 is again loaded onto the carrier of the truck, and will be conveyed to the stock yard. After the main unit 1 has been used in a predetermined posture a predetermined times, and then it will be forwarded to recycling process.

It is almost impossible to select commercial power supply for the main unit 1. A lot of main units 1 are used at once in a field, and the circuit is incorporated in each of the lot of main units 1. If the commercial power supply is selected, a lot of power cables must be connected to the lot of main units 1. This is impractical.

Consequently, battery-driven should be selected to operate the circuit incorporated in the main unit 1. Since power of the battery is consumed as time goes by, a method for reducing wasteful power consumption is needed.

It may be considered to start energizing by the battery by using a mechanical switch when the main unit 1 reaches the stock yard (from the factory), for example.

However, this is not favorable. This is because power of the battery is consumed also in the stock yard, thereby shortening the battery life thereof. In addition, workers should operate all of the mechanical switches to cause long time and hard efforts.

In view of the above, a wireless switch method discussed below is adopted. According to the method, energizing by batteries of a plurality of main units 1 at once can be started in remote control when the main unit 1 is conveyed from the stock yard.

FIG. 5 is a block diagram illustrating a transmitter 30 and a receiver 40 according to Embodiment 1 of the present invention.

This system is configured providing with the transmitter 30 installed in the stock yard and the receiver 40 contained in the sensor-housing case 17. That is, the receiver 40 moves with the main unit 1. The transmitter 30 may be installed not in the stock yard but in a truck carrying the main unit 1 or a construction field.

In this Embodiment 1, the frequency of 13.56 MHz is used and RFID carriers are transmitted. Of course, frequency to be used is not limited to the above frequency, and one of the other frequency bands may be used instead.

The transmitter 30 includes: a power source 31; a switch 33 for switching electric power of the power source 31; an RPM transmitting circuit 32; and an antenna 34 connected to the RFID transmitting circuit 32. When the switch 33 is turned on, the RFID transmitting circuit 32 operates and the carriers of the above-mentioned frequency are transmitted from the antenna 34 to the antenna 41 of the receiver 40.

The receiver 40 includes the following elements.

An antenna 41 receives the above-mentioned carriers. When the antenna 41 receives the above-mentioned carriers, the voltage application circuit 42 generates induced voltage.

When the voltage application circuit 42 generates the induced voltage, an FET 43 is turned on and makes a regulator 44 operate.

When the regulator 44 operates, the regulator 44 supplies electric power of a battery 45 to a microprocessor 46.

Figure 6:
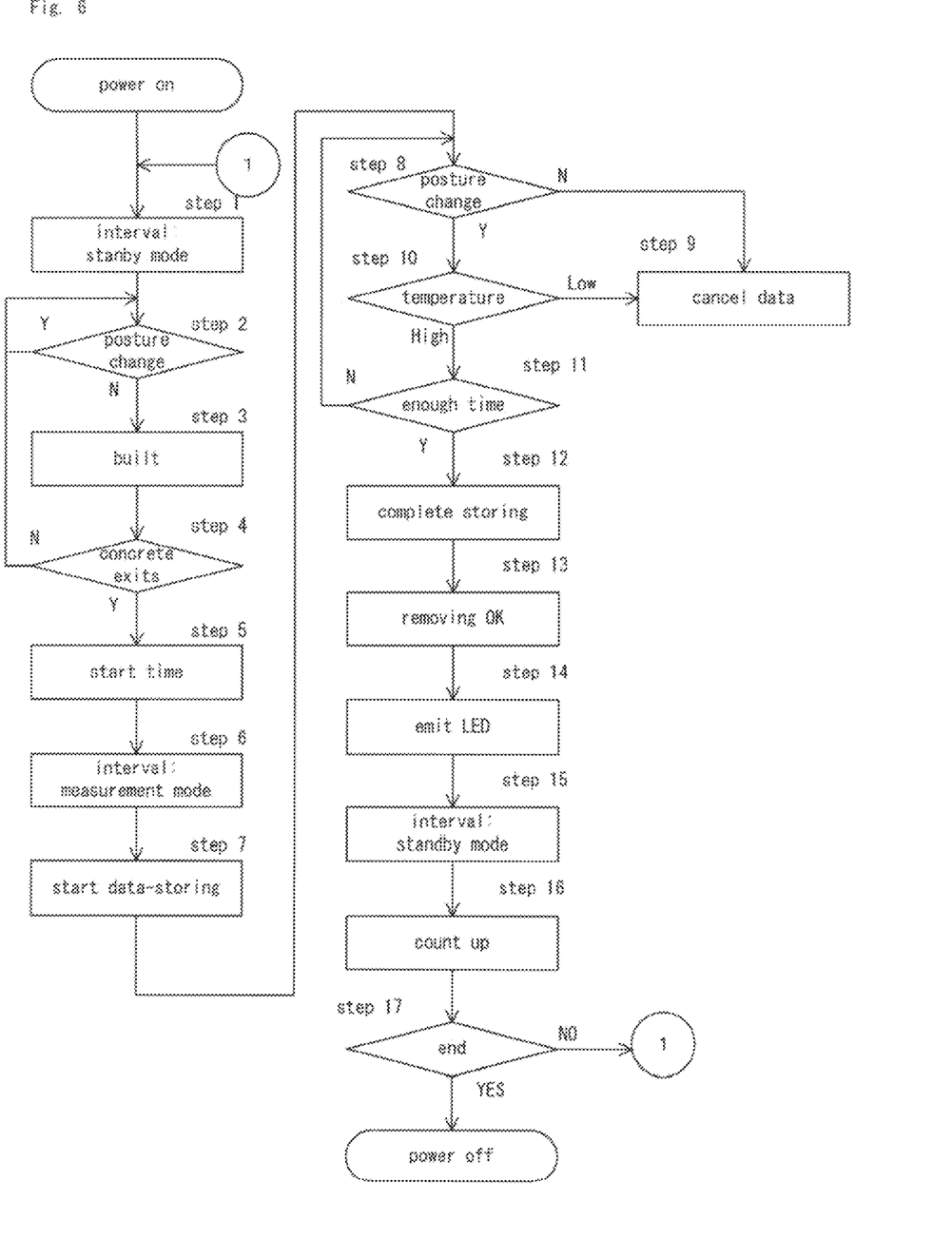
FIG. 6 is a flowchart illustrating operation sequence according to Embodiment 1 of the present invention.

In response to the supply of the electric power, the microprocessor 46 performs processes according to a flowchart of FIG. 6, and controls each of elements of the receiver 40. This configuration assumes that a timer is built in the microprocessor 46.

As shown in FIG. 5, in this configuration, four sensors are provided. As for the outside air temperature-detecting sensor 10, the concrete-detecting sensor 19, and the concrete temperature-detecting sensor 20, explanation thereof has been already made.

The posture-detecting sensor 13 detects at least whether the main unit 1 is in horizontal posture or in vertical posture. An acceleration sensor can be suitably used as the posture-detecting sensor 13.

The acceleration sensor may be of a mechanical type, an optical type, or a semi-conductor type. However, the semi-conductor type of acceleration sensor is preferable, since it is cheap and easy to be handled. The semi-conductor type of acceleration sensor may be of a capacitance type, a piezoresistance type, or a gas temperature distribution type.

The acceleration sensor is preferably of a three-dimensional type. However, a one-dimensional or two-dimensional type of acceleration sensor may be used instead when positions and/or numbers of the acceleration sensors are well-designed. When the acceleration sensor is used, there is an advantage of detecting accidents that may cause to damage the main unit 1, for example a case where the main unit 1 falls down or bumps.

Referring to FIG. 6, operation of the receiver 40 will now be explained. First, when the electric power supply of the microprocessor 46 starts as mentioned above, an interval is set up to a standby mode at step 1.

The "interval" is time spacing between a moment when the microprocessor 46 checks outputs of the sensors 13, 20, 19, and 10 this time and another moment when the microprocessor 46 checks the same next time. If the interval is long, operation of the microprocessor 46 gets slow and there is little consumption of the battery 45 (that is, the life of the battery becomes long outwardly). On the contrary, if the interval is short, operation of microprocessor 46 gets frequent and there is much consumption of the battery 45 (that is, the life of the battery becomes short outwardly).

In Embodiment 1, two intervals of a long interval (e.g. about 1 hour) in the standby mode and a short interval (e.g. 10 to 30 minutes) in a measurement mode are set up.

When the interval is short, detection precision is improved, however, the battery life becomes short. When the interval is long, the battery life becomes long, however, the detection precision is reduced. Therefore, it is preferable to set up the intervals according to laws learned by experience referring to the above example.

At step 2, the microprocessor 16 checks the output of the posture-detecting sensor 13. When the posture changes, the microprocessor 461 stands by as it is. When the posture does not change for a while, processes go to step 3.

The posture always changes while the main unit 1 is conveyed or formworks are built. However, when building supports and formworks have been completed, the main unit 1 is restricted therein and the posture never changes any more.

For this reason, when he posture does not change, the microprocessor 46 recognizes that building the formworks have been completed at step 3. At step 4, the microprocessor 46 checks the output of the concrete-detecting sensor 19, and detects whether or not the concrete 18 exists.

If it is detected that the concrete 18 does not exist, is considered drat the concrete 18 is not cast or that height of the conecrete 18 is insufficient in the middle of casting the concrete 18 although building the formworks has been completed. In this case, processes are returned to step 2.

At step 1, if concrete is detected, processes go to step 5 and the current time is recognized as the start time of curing the concrete 8.

At step 6, the microprocessor 46 changes the interval into the short interval of the measurement mode, that is the interval is shortened.

At step 7, storing necessary data (e.g. data of the start time of curing, posture-detecting, concrete-detecting, temperature-detecting, and so on) is started.

At step 8, it is checked that the posture does not change. If the posture changes, the storing the necessary data is canceled at step 9 and processes return to step 1, since incorrect recognition may be made.

If the posture does not change, it is checked that surface temperature of the concrete 8 is higher than outside air temperature. If not higher, the storing the necessary data is canceled at step 9 and processes return to step 1, since incorrect recognition may be made.

If higher, it is checked that predetermined time has passed since the start time of curing at step 11. The predetermined time is time required for the concrete 18 to harden.

If the predetermined time has not passed, processes are returned to step 8. If passed, storing the necessary data is completed at step 12.

At step 13, the microprocessor 46 recognizes that it is time for removing the recyclable formwork and turns the LED 11 on. Light emitted by the LED 11 indicates that the recyclable formwork can be removed. The workers will remove one after another recyclable formwork whose LED 11 emits the light At step 15, the interval is lengthened to the long interval in the standby mode to extend the battery life. At step 16, the microprocessor 46 counts up a counter of a casting number in the main unit 1. In addition, whether the formwork is used in a horizontal posture or in a vertical posture is also simultaneously saved.

At step 17, if a carrier containing a termination instruction is received, the processes end.

As mentioned above, in Embodiment 1, the start time of curing is recognized under a condition where all of the posture-detecting, the concrete-detecting, and the temperature-detecting acknowledge that the concrete is cast is fulfilled.

Otherwise, there are the following problems.

When the recognition is made only according to the posture-detecting, incorrect recognition may be made. This is because there may be a case where the recyclable formwork is quietly stocked in the stock yard or the factory the posture of the recyclable formwork never changes and the posture-detecting shows yes, although the concrete has not been cast yet.

When the recognition is made only according to the concrete-detecting, incorrect recognition may be made. This is because there may be a case where the main unit 1 gets wet with rain, or another case where neighborhood of the main unit 1 is under water and the concrete-detecting shows yes, although the concrete has not been cast yet.

When the recognition is made only according to the temperature-detecting, incorrect recognition may be made. This is because there may be a case where at least one of air temperature, weather, and solar radiation causes to raise the detected-temperature and the temperature-detecting shows yes, although the concrete has not been cast yet.

On the contrary, synthesizing the three above-mentioned detection results enables to dissolve incorrect recognition, thereby improving detection precision. Thus, the method for detecting the start time of curing according to Embodiment 1 adopts recognizing the start time of curing when all of the three condition (1) to (3) are fulfilled, the three conditions being: (1) the posture of main unit 1 is recognized not to change according to the posture-detecting sensor 13; (2) existence of concrete is recognized according to the concrete-detecting sensor 19; and (3) concrete temperature is recognized to raise enough according to the concrete temperature-detecting sensor 20.

Figure 7:
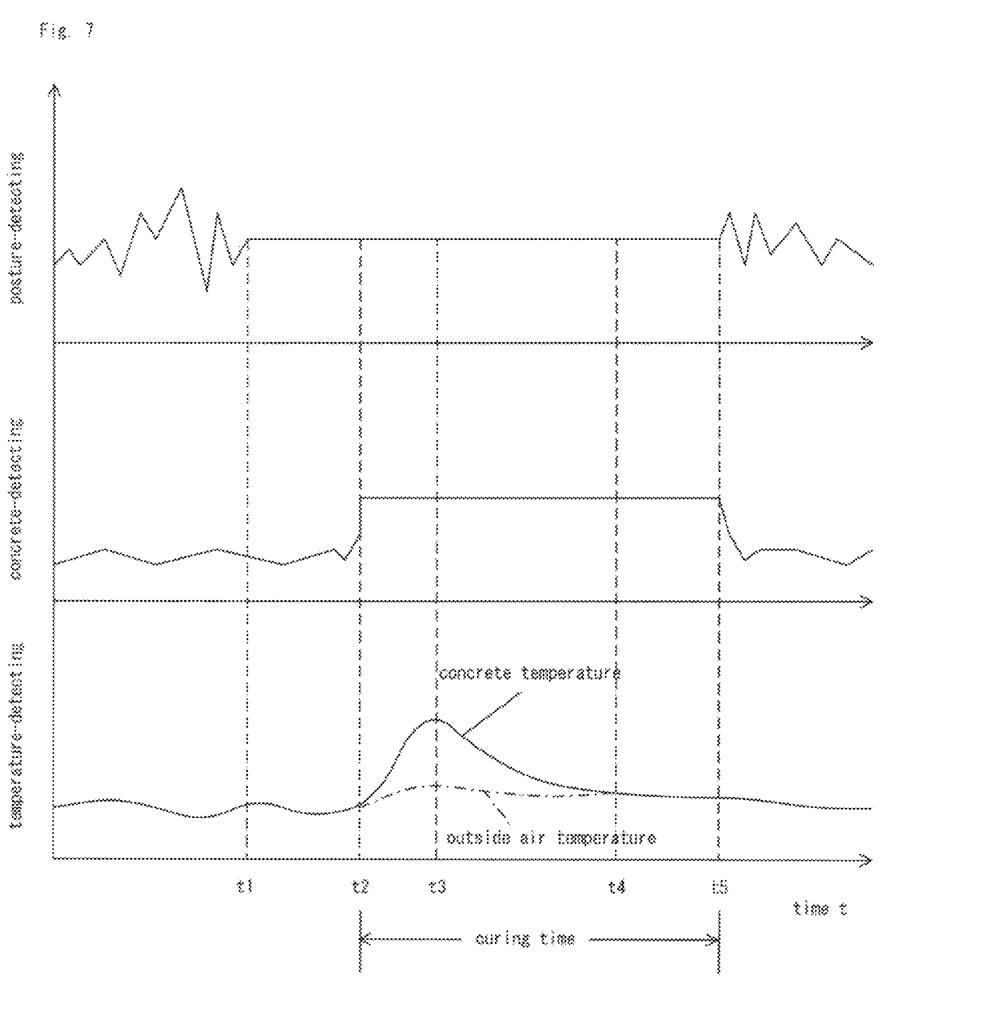
FIG. 7 is a time chart illustrating detection results according to Embodiment 1 of the present invention.

Referring to FIG. 7, an example regarding how the three above-mentioned detection results change as time goes by will now be explained. FIG. 7 is a time chart illustrating the detection results according to Embodiment 1 of the present invention.

In FIG. 7, a horizontal axis shows time t, and a vertical axis shows each of the detection results. When the three-dimensional acceleration sensor is used, three-dimensional posture detection result is obtained. However, for simple explanation, only one-dimensional posture detection result is illustrated in FIG. 7.

At the beginning of detecting, the main unit 1 is conveyed or built. The posture of the main unit 1 continues to change. Since concrete does not exist in front of the main unit 1, and the concrete is not detected. If the capacitance sensor is used, capacitance lower than the predetermined capacitance is detected. The temperature of the main unit 1 is almost equal to air temperature.

In time t1, the posture does change. This means that the main unit 1 turns into a static state. Completing building causes the static state normally. Whereas, the concrete-detection result and the temperature-detection result hardly change at this time.

Then, casting concrete is started. However, immediately after the ing, cast-concrete does not reach the main unit 1 for a while.

In time t2, the cast-concrete reaches the main unit 1, and the concrete-detection result continues to indicate the existence of the cast-concrete. Whereas, the posture-detection result indicates that the posture does not change, and concrete temperature begins to rise.

At this time t2, since all of the three detection results indicates together that the cast-concrete has reached the main unit 1 for the first time, time t2 is recognized as the start time of curing, After time t2, chemical reaction actively advances within the cast-concrete. Heat caused by the chemical reaction makes concrete temperature rise higher than outside air temperature (See, dotted line). The difference between the concrete temperature and the outside air temperature may be about 40 degrees. However, the difference may change caused by the chemical reaction and/or a state of the open air, or the like.

In this example, in time t3, the difference reaches a peak, and in time t4 the difference becomes zero again, in other words, the concrete temperature is almost equal to the outside air temperature.

In time t5, the predetermined time (required curing period) has passed since time t2. Then, it is recognized that sufficient curing has been completed, and the LED 11 turns on. Thus, based on objective data, which humans (e.g. workers) never concern, it can be proved that necessary temperature difference and curing time have been secured. Quality of completed structure (e.g. strength or the like) can be directly and precisely shown.

After time t5, since removing the recyclable formwork is started, the posture-detection result indicates the posture changes. And, the concrete-detection result and the temperature-detection indicate the same as before time t1, respectively.

The recyclable formworks according to the present invention are suitably used for managing each recyclable formwork in a field that the recyclable formworks are lent.

1: Main unit of recyclable formwork
1*a*: Non-contact surface
2: Contact surface
2*a*: Separator hole
3: Long side edge rib
3*a* and 4*a*: Clip hole
4: Short side edge rib
5: Long side reinforcing rib
6: Short side reinforcing rib
7: Case
8: Substrate holder
9: Main substrate
10: Outside air temperature-detecting sensor
11: LED
12: Protection case
13: Posture-detecting sensor
14: Battery case
15: Sensor substrate
16: Through-hole
17: Sensor-housing case
17*a*: Bottom surface
18: Concrete
19: Concrete-detecting sensor
21, 22: Terminal/cable
23: Electrode
24: Glass epoxy substrate
25: Lid
30: Transmitter
31: Power supply
32: RFID-transmitting circuit
33: Switch
34, 41: Antenna
40: Receiver
42: Voltage application circuit
43: FET
44: Regulator
45: Battery
46: Microprocessor
t: Difference

What is claimed is:

1. A recyclable formwork, comprising:
a main unit including a contact surface contacting with cast concrete, a non-contact surface being parallel and opposite to the contact surface, and a plurality of ribs penetrating from the non-contact surface to a side opposite to the non-contact surface and reinforcing said main unit;

a case being housed between the plurality of ribs and being fixed on a side of the non-contact surface; and a circuit being stored in said case, wherein:

a through-hole is opened at a position corresponding to where said case is fixed, the through-hole penetrating said main unit from the non-contact surface to the contact surface;

a sensor-housing case is provided with a lower portion of said case, the sensor-housing case being inserted into the through-hole, a bottom face of the sensor-housing case facing the concrete; and a concrete temperature-detecting sensor is housed in the sensor-housing case, the concrete temperature-detecting sensor detecting surface temperature of the concrete.

2. A recyclable formwork as defined in claim 1, wherein the bottom face of the sensor-housing case is set flush with the contact surface.

3. A recyclable formwork as defined in claim 1, wherein a concrete-detecting sensor is further housed in the sensor-housing case, the concrete-detecting sensor detecting whether or not the concrete is contacting with the contact face.

4. A recyclable formwork as defined in claim 1, wherein the bottom face of the sensor-housing case contacts the concrete.

* * * * *